3,060,973
FABRIC REINFORCED RUBBER TUBE
Elmer J. Mlinar, Darien, Conn., assignor to The Weatherhead Company, Cleveland, Ohio, a corporation of Ohio
Filed July 17, 1958, Ser. No. 749,265
2 Claims. (Cl. 138—126)

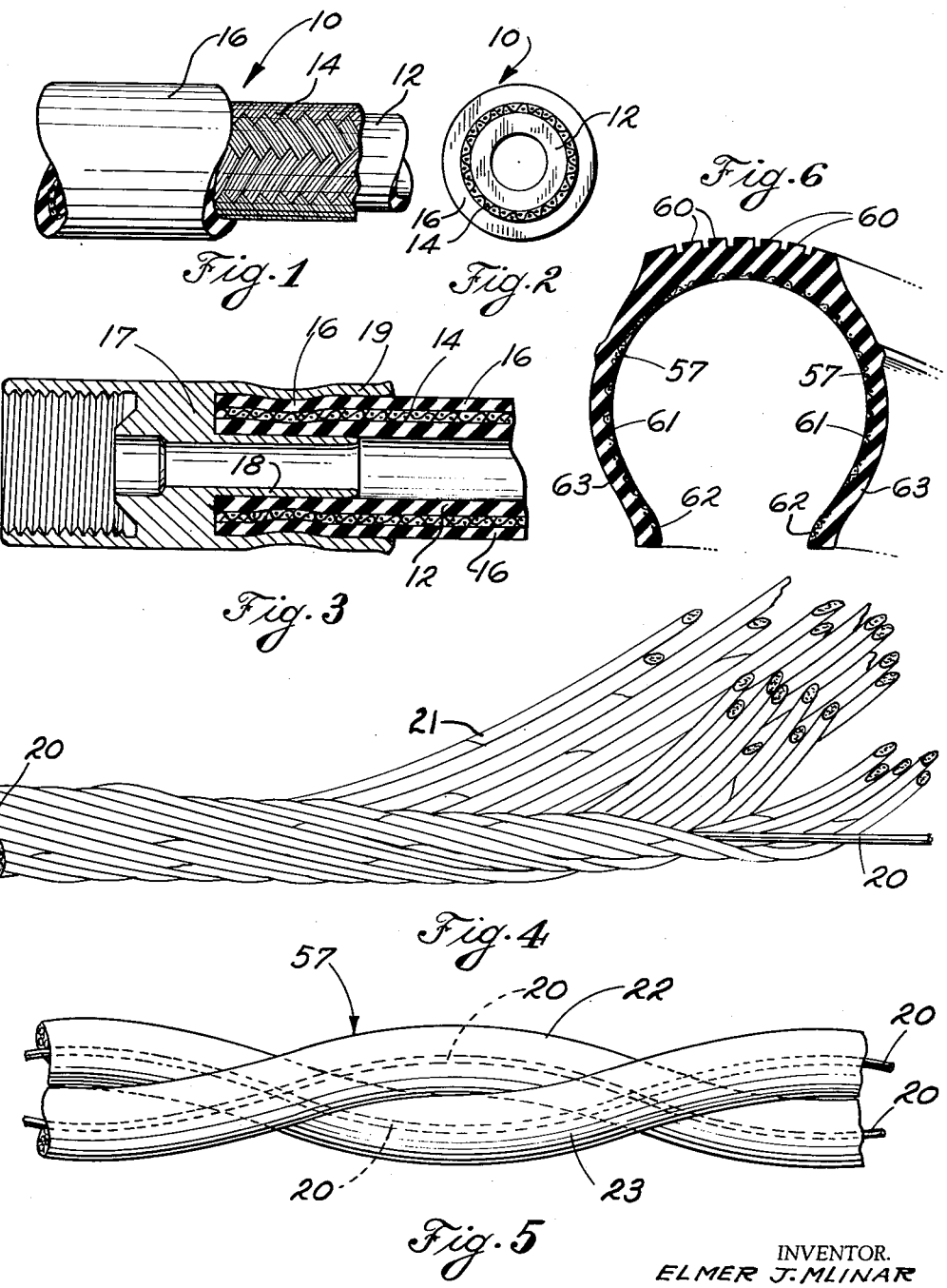

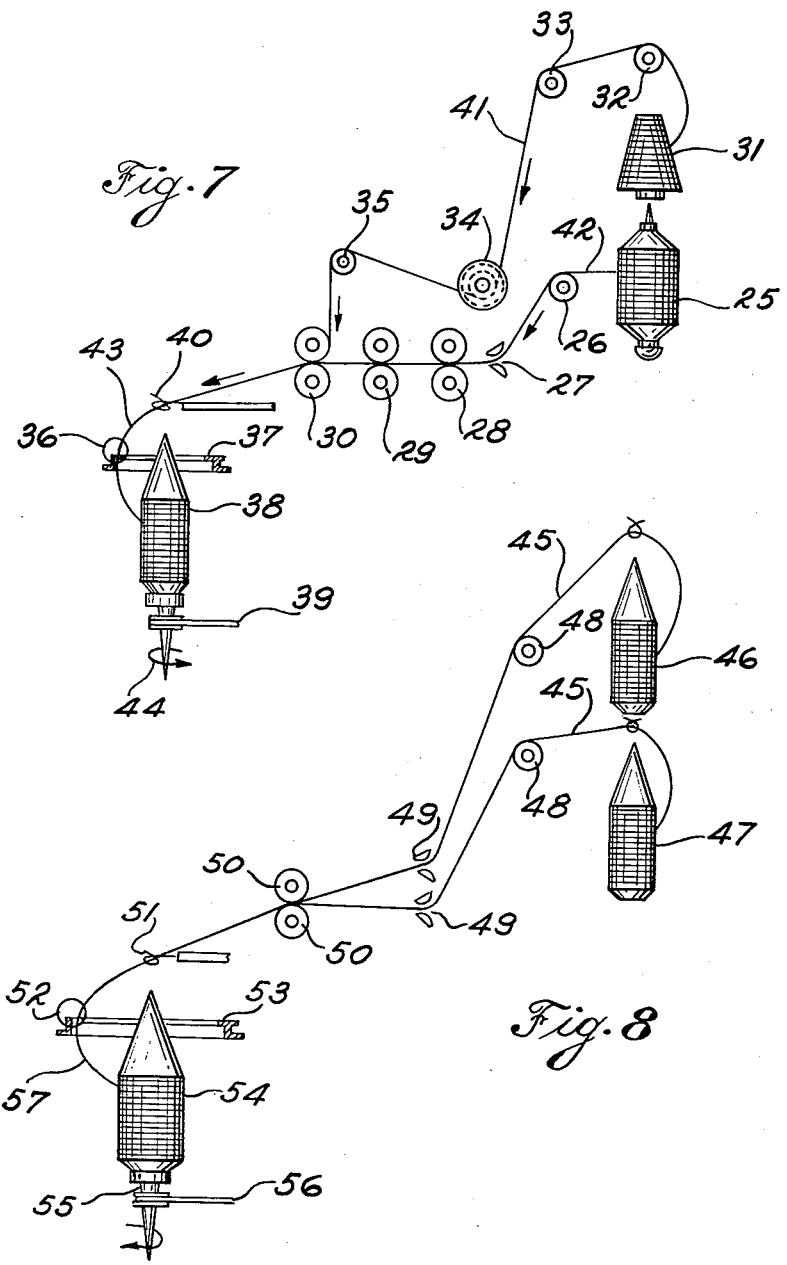

This invention relates to a composite flexible material and more particularly to a material composed of rubber or rubber substitute bonded to multiple core yarn threads or fabrics for hydraulic hose and similar articles.

Hydraulic hose has commonly been made of alternate tubular layers of rubber or rubber-like material, such as neoprene, and reinforcing fabrics, such as cotton yarn braided about the extruded tubular rubber surfaces. The rubber or rubber-like material renders the hose or similar article impervious to fluids, and the layers of reinforcement are required to provide the necessary strength to resist bursting.

In order to obtain the full strength of the materials under various kinds of applied stresses, including axial pull in the case of hydraulic hoses, it is necessary to bond the layers of rubber material to the layers of reinforcing fabric firmly throughout their entire engaging surfaces so that no parts of the rubber can separate from the reinforcement. The rubber material and the reinforcing fabric tend to separate because of their differences in extensibility under stress. Cotton yarn and similar material made of twisted, relatively short staples provides an effective and uniform bond when the fabric is pressed tightly against the rubber-like material while the latter is soft and pliable and the composite material is thereafter heated to vulcanize or cure the rubber or rubber substitute material.

However, in hydraulic hose and the like in which the reinforcing fabric is made by braiding cotton yarn on the surface of tubular extruded rubber-like material, the tension that can be applied during braiding is limited by the tensile strength of the yarn, and thus the full possibilities of bonding between the fabric and the rubber cannot be realized. For this reason also, multiple layers of fabric are desirable.

Reinforcing fabric made of braided or woven short staple material such as cotton yarn also provides thorough covering of the rubber-like material and prevents the rubber-like material being extruded or squirted between the fabric threads by high pressures applied to the composite material. For hose and the like to withstand higher pressures it has been common to replace an outer fabric layer with a layer of braided wire, one or more layers of fabric reinforcement being retained to prevent the rubber-like material from extruding or squirting through the reinforcement and to maintain reinforcement bonded to the rubber so that stresses such as axial pull applied to a hose between metallic hose ends do not act to break and strip off short tubular portions of the rubber layers.

Fabric having higher tensile strength than that woven or braided from cotton yarn can be made with substantially continuous or long staple synthetic fibers, but such fabric is not suitable for reinforcement of composite material because it does not provide adequate covering for resisting extrusion or penetration of the rubber-like material between the reinforcing threads, nor adequate bonding to prevent separation of the rubber layers from the fabric layers.

Natural fibers, such as cotton, have better characteristics both for bonding and for covering because the natural fibers do not have the smooth surface characteristic of extruded synthetic fibers. Dried cotton, for example, has a spiral structure resembling a twisted, flattened band. Thus, small air pockets are created between the individual staple fibers which are frictionally held together in a yarn, so that the cotton yarn is bulkier than a yarn of equivalent weight per yard consisting of extruded synthetic fiber even though the synthetic fiber may have a lower specific gravity than the cotton fiber.

According to the present invention, a composite material for hydraulic hose and similar uses is produced by bonding together rubber-like material and a fabric reinforcement made of braided or woven multiple core yarn, the yarn comprising multiple threads twisted together, each thread having a core of substantially continuous high tensile strength synthetic fiber and a sheath of staple fibers such as cotton, each individual fiber having its natural spiral, the core fibers in the multiple yarn being substantially free of twist so as to be substantially free from torsional stress under tension. The cotton or other short staple sheath of the yarn is firmly and completely bonded to the adjacent rubber or rubber-like material, which encases and grips the great multitude of free ends of the fibers.

The substantially continuous or long staple core threads of high strength synthetic material, on the other hand, are not bonded to the rubber-like material and are thus free to shift and move slightly within their short staple sheaths so as to develop the maximum strength of the material of the core threads against stresses in all directions and at all times even when the composite material is flexed or bent. The core threads are secured to the sheaths against axial displacement by the twisting together of a plurality of core yarns so that the core filaments, while substantially free of twist about their own axes, lie in intertwined helices with each core surrounded by a corresponding helix of short staple fiber sheathing.

The individual staple fibers of the sheaths are frictionally interlocked with each other when the staple fibers are twisted about the core fibers to produce the individual core yarn assemblies. This friction is maintained by the pressure created by the shape memory of the individual fibers which tends to untwist and restore them to their natural spiral form. After a plurality of such core yarn assemblies are ply-twisted together, so as substantially to remove the twist of the core fibers, the pressure of the individual core yarn assemblies against each other in the multiple core yarn produced by the ply-twisting maintains the staple for the fibers frictionally gripped together to maintain the continuity of the sheaths. Thus, tension applied to the yarn in any manner tightens the sheath fibers against the core fibers, frictionally locking the sheaths and cores together, so that the tension is transmitted to and carried by the high tensile strength core fibers, as well as by the staple fiber sheaths.

By the use of multiple core yarn in which the core fibers are substantially twist-free or have only a nominal twist and in which the individual core yarns are twisted together with a substantial or fairly low twist, for example, with a twist multiplier of about 2.8, it is possible to develop the full strength of the synthetic core fibers to resist forces transmitted from the rubber material, through the bond between the rubber and the short staple sheathing, and thence to the core fibers themselves. If the individual core yarns were not twisted together it would not be possible to develop the frictional grip between the short staple sheath fibers and the core fibers and the sheaths would slip upon the core fibers rather than transmitting the forces to them. On the other hand, if the core fibers were twisted about their own axes a corresponding amount the strength of the core fibers in tension would be substantially reduced because tension upon the core fibers would produce torsional shearing stresses causing the core fibers to fail under loads much less than the ultimate tensile strength of the untwisted fibers or filaments.

At the same time, the smooth surfaced, substantially continuous core threads are prevented from cutting into the rubber-like material or permitting it to extrude therebetween because the short staple sheaths surrounding the core threads prevent direct contact between the rubber and the core threads and being firmly bonded to the rubber are permanently fixed in their positions surrounding the core threads.

When composite material, according to this invention, is produced by braiding the multiple core yarns over an extruded tube of rubber-like material much more complete and more uniform bonding between the reinforcing fabric and the rubber can be obtained by braiding the core yarns under tension. The high strength substantially continuous fibers of the cores, frictionally interlocked with the short staple sheaths, permit the yarns to be braided under greater tension than can be used with cotton yarns, for example, to produce a tight braid firmly embedded into the rubber-like material. At the same time, the short staple sheaths prevent the tensioned yarns from cutting into the rubber-like material as the smooth surfaced high strength core fibers alone would do if braided under such tension. In this manner a dense uniformly bonded reinforcement can be produced with a single layer of braid, the continuous bonding and the high tensile strength in the material permitting one layer of braid to replace several layers of reinforcement of the prior types.

Composite material in accordance with this invention when made in the form of hydraulic hose, for example, provides adequate strength in a single, relatively thin layer of reinforcing fabric to replace multiple reinforcing fabric and wire layers heretofore used. The resulting reduction in wall thickness for given pressures and loads not only saves cost and weight but further increases the utility of the hose by permitting sharper bends without failure and by reducing the friction and consequent heating from repeated flexing or bending. The freedom of the core fibers for slight relative movement within their bonded sheaths also permits sharper bending of the composite material without failure or reduction in strength and further reduces the friction of heating from repeated flexing or bending.

The principal object of the present invention is to combine, in a composite material for hydraulic hoses and the like, minimum thickness and weight with maximum tensile and bursting strength, imperviousness to fluid leakage and complete and permanent bonding of the rubber-like material and the reinforcing material.

Other objects and advantages of the invention will appear from the following detailed description of a preferred embodiment of the invention.

In the accompanying drawings,

FIG. 1 is a side view with parts broken away showing a hydraulic hose constructed in accordance with the invention;

FIG. 2 is an end view of the hose shown in FIG. 1;

FIG. 3 is a side elevation, with parts in section, of a hose assembly embodying the invention;

FIG. 4 illustrates schematically the construction of each individual core yarn;

FIG. 5 illustrates schematically the manner in which two or more core yarns are plied together to form a finished yarn;

FIG. 6 is a diagrammatic cross-section through a pneumatic vehicle tire composed of composite rubber and fabric material according to the present invention;

FIG. 7 is a diagrammatic illustration of a spinning frame for making the core yarn; and FIG. 8 is a diagrammatic illustration of a twisting frame for plying together a plurality of core yarns.

Referring now more particularly to FIGS. 1 and 2 of the drawings, 10 represents generally a reinforced hose assembly according to this invention having a fluid impervious, rubber, neoprene or other plastic hose section 12 through which a fluid may be conducted, and a braided reinforcing sleeve 14 covering the hose 12 along its length. The sleeve 14 is tightly braided on the hose 12 and a rubber or other plastic covering 16 is extruded over the outer surface of the sleeve 14. After the parts are arranged as shown, the entire hose may be vulcanized where rubber is used or cured where other plastic material is used to produce a hose with the layers secured to each other.

To make a hydraulic hose assembly a cut length of the hose made as described above has a metallic hose end 17 of any desired type secured to each end of the hose in any desired manner. As illustrated, the hose end 17 is formed with a nipple 18 forced into the central bore in the inner hose section 12 and a sleeve 19 fitting over the outer surface of the outer layer 16 and crimped inwardly to grip the end of the hose itself between the sleeve 19 and the nipple 18.

As illustrated schematically on an enlarged scale in FIGS. 4 and 5, each core yarn comprises a central core of twisted substantially continuous fiber 20 and a surrounding sheath of correspondingly twisted short staple fibers 21 of cotton or the like. Two such yarns, indicated at 22 and 23, are illustrated schematically ply-twisted together in FIG. 5 to form a multiple core yarn 57. While two individual yarns are shown in FIG. 5, it will be understood that more may be twisted together if desired.

The substantially continuous core fibers are made of relatively high tensile strength material, such as nylon, "Dacron," glass, cellulose derivatives, and the like, or of any long staple or substantially continuous natural or synthetic fibers. Preferably the core fibers are made from a linear polyamide (nylon), a polyester such as polyethylene terephthalate ("Dacron"), acrylic fiber such as polyacrylonitrile ("Orlon"), or cellulose derivatives. The core may be in mono-filament form but is preferably a large number of substantially parallel smaller filaments.

Referring to FIG. 6 of the drawings, the present invention may also be used to make a pneumatic vehicle tire. As illustrated, the tire may consist of a tread portion 60, a body portion 61, bead portions 62—62 and side wall portions 63—63. The body portion 61 is made from weak wefted tire fabric or similar conventional fabric construction embodying load bearing multiple core yarns 57 produced in accordance with this invention. The fabric embodying the multiple core yarns 57 is impregnated with a suitable rubber-to-fabric adhesive, a tire body rubber composition is calendered onto the reinforcing fabric and a tire body is built on the tire building machine in the usual manner from bias cut plies of the calender fabric. The bead 62 and the tread element 60 are plied to the tire body and the green tire is then shaped and vulcanized in the mold in the usual manner. The rubber-to-fabric adhesive, which may be any of the usual rubber cements used for bonding rubber to cotton and similar fabric, aids in tightly bonding the staple sheaths of the multiple core yarns 57 to the rubber composition calendered thereon but does not firmly bond the core filaments to their surrounding sheaths because the staple fiber sheaths resist penetration of the cement and the smooth surfaces of the extruded synthetic core filaments adhere only weakly to any cement which reaches it. Thus, the core filaments remain free to move slightly within the sheaths to which they are secured by friction, avoiding any concentration of stresses on individual filaments and greatly reducing friction and heating during flexing.

The individual yarns or plies may be made on a spinning frame, such as a conventional ring spinning frame diagrammatically illustrated in FIG. 7. The short staple sheath material, such as cotton, is wound in the form of a roving 42 on a bobbin 25. The roving, which consists of staple fibers loosely held together with a conventional roving twist, passes through a draft organization which may be in accordance with conventional practice in such spinning frames. As illustrated, the roving 42 passes over a roller 26, through a guide throat 27 and between pairs of draft rolls 28, 29 and 30. One roll of each pair 28, 29 and 30 is power driven. The rolls are geared so that the rolls 29 rotate faster than the rolls 28, and the rolls 30 rotate faster than the rolls 29. The spacing between rolls is greater than the staple length so that the roving is drawn and compacted to a smaller diameter in passing through the rolls.

The core filament or filaments are wound on a bobbin 31 and guided under tension to the pass between the final draft rolls 30. As illustrated, the core filaments are led over two guide bars 32 and 33 through a tension device 34 and over a guide bar 35 into position to partially wrap around the upper roll of the final pair of draft rolls 30 to be delivered in alignment with the roving. When the core material consists of multiple filaments they are also preferably wound on the bobbin 31 with a nominal twist so as to retain the filaments grouped together.

From the final pair of draft rolls 30 the composite thread is led through a thread guide or pigtail 40, through a traveller 36 supported for free rotation in a spinning ring 37, and is spun by, and wound onto a bobbin 38. The bobbin 38 is driven by a belt or the ilke 39 and rotates at a relatively high speed spinning the traveller 36 about the ring 37 and twisting the composite thread about its axis. The twisted thread is wound onto the bobbin at the rate at which the composite thread is delivered from the final pair of draft rolls 30 so that the twist imparted to the thread per inch is substantially equal to the revolutions per minute of the bobbin 38 divided by the inches per minute of thread delivered by the final pair of draft rolls 30.

The tension device 34 may be any conventional arrangement for this purpose, such as a pair of washers relatively slidable on a rotatable axle and spring-pressed together to grip the core filaments therebetween. The draft rolls 28, 29 and 30, because of their different speeds of rotation, draw out and attenuate the sheath roving by slipping the fibers relative to each other with the result that the fibers of the sheath roving are under substantially no tension as they pass between the final pair of draft rolls 30. For making the fabric of the present invention, the tension device 34 is adjusted so that the core filaments 41 are under greater tension than the sheath roving 42 as it passes between the final pair of draft rolls 30. When the tension is relieved as the core filaments leave the bite of the final pair of draft rolls 30, the core contracts and the slightly greater length of sheath roving which has been delivered by the rolls 30 wraps around the core. Thus, as the composite roving 43 is twisted about its axis by the spinning of the traveller 36, the core filaments 41 are automatically positioned at the center of the resulting yarn and the sheath roving 42 is twisted about the core. The core is twisted about its own axis to the same number of turns per inch as the twist imparted to the sheath roving surrounding the core. The individual fibers in the sheaths acquire much less twist about their own axes because of their relatively short lengths. The spinning action tends to arrange the short staple sheath fibers in generally helical paths with most of the fibers having their leading ends positioned close to the core fibers, and their trailing ends spiraling outwardly and emerging from the surface of the finished yarn.

In accordance with the present invention it is preferred to spin the yarn with a low-to-medium degree of twist, with a twist factor or multiplier in the neighborhood of three. For example, the core may consist of a roving 41 comprising filaments of nylon, "Dacron" or the like, and the cotton roving 42 may be drawn and twisted thereabout to produce a yarn of 12 count. Thus, with a twist factor of three the yarn has slightly over ten turns per inch. As indicated by the arrow 44 in FIG. 7, the bobbin 38 may be rotated in a direction to produce an S twist in each individual core yarn assembly.

Two or more core yarns 45 produced as described above are then plied together with a twist in the opposite direction, preferably with a slightly lower twist factor than that used in making the individual core yarns. Thus, if the individual core yarns 45 are given an S twist with a twist multiplier of three as described above, the yarns may be plied together with a Z twist and a twist multipler of about 2 to 3.5. The yarns 45 may be plied together in a conventional twisting frame illustrated diagrammatically in FIG. 8. Two bobbins 46 and 47 are supported for free rotation, each being wound with one or more core yarns 45 produced as described above. As shown, the yarns are threaded over separate guide bars 48 through guides 49 and are thrown together and delivered substantially parallel by feed rolls 50. From the feed rolls 50 the yarns pass through a thread guide 51, through a traveller 52 freely rotatable on the ring 53 and are twisted by, and wound onto a bobbin 54 on a twisting spindle 55. The bobbin 54 is rotated rapidly to ply the yarns 45 together, the degree of twist being determined by the relation between the spindle speed and the rate of delivery of the yarns through the feed rolls 50. As illustrated, the bobbin 54 is rotated by a belt 56 in a direction to ply together with a Z twist, the individual yarns formed with an S twist.

The degree of twist in plying the individual yarns together is close to, but preferably slightly less than, the degree of twist in the individual yarns themselves. As a consequence the twist imparted to the core filaments in the formation of the individual yarns is removed or substantially removed in the operation of plying together the separate yarns to make the multiple core yarn 57. The sheath fibers return substantially to their natural spiral and remain arranged and frictionally interlocked around each core and, at the same time, become frictionally interlocked with the sheath fibers on the remaining core yarn or yarns embodied in the multiple core yarn 57. The cores of the yarns, substantially free of twist about their own axes, lie in parallel helices within their respective sheaths. The twist factor used in twisting the individual yarns 45 together to form the multiple yarn 57 is sufficiently high so that the cores are frictionally gripped by the sheaths so that tension applied to the sheath fibers is transmitted to and carried by the core fibers. Any pull applied to the multiple core yarn tightens the individual yarns against each other, increasing the frictional engagement between each sheath and its core in the manner of a knot. At the same time, the core fibers are capable of transmitting loads substantially equal to the full tensile strength of the material because they have little, if any, twist about their own axes and thus tension forces do not create torsional or shear stresses as they do in twisted filaments.

The multiple core yarns 57 constructed as described above are braided, woven or otherwise suitably interlaced and bonded to natural or synthetic rubber to produce the composite material of the present invention. In the illustrated embodiment, a plurality of such multiple core yarns are braided onto the outer surface of the rubber tube 12 in uncured or unvulcanized condition to form the reinforcing sleeve 14. This operation may be carried out on conventional braiding machines but, because of the high tensile strength of the multiple core yarn, the braiding may be performed under greater tension than can be used with ordinary cotton yarns. At the same time, the braiding may be performed under greater tension than would be feasible with yarns consisting solely of the synthetic fiber core material, because such yarns would cut into the rubber tube 12, whereas, the short staple sheaths on the multiple core yarns resist such cutting into the rubber. After the sleeve 14 has been braided upon the rubber tube 12, the sleeve may be coated with rubber cement or other suitable adhesive and the outer rubber tube 16 extruded thereover from uncured or unvulcanized natural or synthetic rubber. Thereafter, the hose is heated to vulcanize or cure the rubber.

For use in a hydraulic hose assembly the completed hose has a hose end 17 secured to each end thereof as shown in FIG. 3. The compression of the end portion of the hose between the inner nipple 18 and the outer crimped sleeve 19 compresses the hose under the crimp and firmly interlocks the hose end with the inner and outer rubber tubes 12 and 16 of the hose.

Axial forces attempting to pull the hose away from the hose end are transmitted from the hose end to the rubber tubes. The rubber is firmly and continuously bonded to the fabric sleeve because of the "nap" or multitude of ends of the short staple fibers composing the sheaths of the multiple core yarn. The sheaths in turn transmit the loads to the core filaments by reason of the frictional interlocking between the sheaths and the cores in each multiple core yarn. The core filaments are free to move slightly so as to distribute the load equally between all parts of the cores, but are prevented from slipping axially relative to the sheaths by the increased frictional grip resulting from the plying together of the multiple core yarns. The core filaments in turn are able to withstand the applied loads with substantially full tensile strength of the material of the cores because of the absence of axial twist in the cores themselves.

It will be apparent that other stresses that may be applied to the hose, such as bursting stresses, are transmitted to and resisted by the core fibers in the same way. At the same time, because the core filaments are not bonded to the sheath fibers or to the rubber portions of the composite material the strength of the material is not materially reduced when it is bent or curved as, for example, when a hydraulic hose is looped or bent between its ends. The core fibers accommodate such bending and remain free to adjust themselves so as to distribute the loads over all of the core fibers. Similarly, repeated flexing of the composite material produces a minimum of friction and heating because of the absence of bonding between the rubber and the core fibers.

Hydraulic hoses manufactured in accordance with the present invention embodying core fibers of nylon, "Dacron" or similar high strength synthetic substantially continuous filaments are capable of resisting internal pressures and other loads which heretofore required the use of a wire braid in the hose in addition to one or more cotton fabric braids. This permits a great saving in material and cost of manufacturing and, in addition, a greatly increased life for the hose because the multiple core yarn has a much greater fatigue resistance than a wire braid.

The word "rubber" is used herein and in the claims as designating either natural or synthetic rubber, embracing such materials as neoprene, butyl, "Teflon" and the like. The term "synthetic fiber" is used to designate man-made fibers as distinguished from natural fibers.

While a preferred embodiment of the invention has been described in considerable detail, it will be understood that the composite material embodying this invention may be used in other articles than hydraulic hoses and that many changes and variations may be resorted to without departing from the scope of the invention as defined in the following claims.

I claim:

1. A hose comprising a flexible fluid impervious rubber tube, a braided sleeve tightly enclosing said tube, said sleeve comprising closely interlaced multiple core yarns each of which comprises two or more core yarns twisted together, each core yarn comprising a central core of substantially continuous synthetic fiber surrounded by a sheath of staple fiber, the cores in the multiple core yarn being substantially free of twist about their own axes, whereby axial stresses applied to said cores do not create torsional or shear stresses in said cores, said cores being frictionally interlocked with their surrounding sheaths by the twisted relation of the core yarns in each multiple core yarn, the said rubber tube being bonded to the inner surfaces of the staple fibers of the sheaths of said core yarns and being secured by such sheaths against extrusion through said braided sleeve, the cores of said multiple core yarns being free for limited movement relative to their surrounding sheaths to avoid concentration of stresses on individual core fibers, said rubber tube being adapted to be secured to and gripped by a hose end and said tube transmitting tension forces to said staple fiber sheaths by means of the bonded relation thereof, and said sheaths transmitting such forces to said core fibers by means of the frictional interlocking therebetween.

2. A hose comprising a flexible fluid impervious rubber tube, a braided sleeve tightly enclosing said tube, said sleeve comprising closely interlaced multiple core yarns each of which comprises two or more core yarns twisted together, each core yarn comprising a central core of substantially continuous synthetic fiber surrounded by a sheath of staple fiber, the cores in the multiple core yarn being substantially free of twist about their own axes whereby axial stresses applied to said cores do not create torsional or shear stresses in said cores, said cores being frictionally interlocked with their surrounding sheaths by the twisted relation of the core yarns in each multiple core yarn, a second rubber tube tightly enclosing said braided sleeve, the said rubber tubes being bonded to the adjacent surfaces of the staple fibers of said braided sleeve, said rubber tubes transmitting tension forces to said staple fiber sheaths by means of the bonded relation thereof and said sheaths transmitting such forces to said core fibers by means of the frictional interlocking therebetween, said core fibers being free for limited movement relative to their surrounding sheaths and to said rubber tubes to avoid concentration of stresses on individual core fibers.

References Cited in the file of this patent

UNITED STATES PATENTS

| | | |
|---|---|---|
| 1,668,560 | Healy | May 8, 1928 |
| 2,317,912 | Howe | Apr. 27, 1943 |
| 2,477,652 | Robins | Aug. 2, 1949 |
| 2,591,628 | Snyder | Apr. 1, 1952 |
| 2,688,576 | Ryan et al. | Sept. 7, 1954 |
| 2,690,767 | Brown | Oct. 5, 1954 |
| 2,725,321 | Martello | Nov. 29, 1955 |
| 2,752,952 | Dauphinois | July 3, 1956 |
| 2,755,214 | Lyon et al. | July 17, 1956 |
| 2,786,507 | Howe et al. | Mar. 26, 1957 |
| 2,800,145 | Peierls et al. | July 23, 1957 |